(12) United States Patent
Pallanca et al.

(10) Patent No.: US 8,696,870 B2
(45) Date of Patent: Apr. 15, 2014

(54) DEVICE FOR DESALINATING SEA WATER BY AMBIENT-TEMPERATURE SPRAYING

(76) Inventors: Charles Pallanca, Nice (FR); Henri Renggli, Le Cannet (FR); Gil Ching, Le Bar sur Loup (FR)

( * ) Notice: Subject to any disclaimer, the term of this patent is extended or adjusted under 35 U.S.C. 154(b) by 568 days.

(21) Appl. No.: 12/810,294

(22) PCT Filed: Dec. 15, 2008

(86) PCT No.: PCT/FR2008/001740
§ 371 (c)(1),
(2), (4) Date: Jun. 23, 2010

(87) PCT Pub. No.: WO2009/103890
PCT Pub. Date: Aug. 27, 2009

(65) Prior Publication Data
US 2010/0264010 A1    Oct. 21, 2010

(30) Foreign Application Priority Data
Dec. 27, 2007   (FR) ..................................... 07 09113

(51) Int. Cl.
| | |
|---|---|
| *B01D 1/16* | (2006.01) |
| *B01D 1/18* | (2006.01) |
| *B01D 3/00* | (2006.01) |
| *C02F 1/04* | (2006.01) |
| *C02F 1/36* | (2006.01) |
| *C02F 103/08* | (2006.01) |

(52) U.S. Cl.
USPC ........... 202/155; 159/4.01; 159/16.1; 159/45; 159/48.1; 159/901; 202/172; 202/176; 202/182; 202/185.3; 202/200; 202/236; 203/10; 203/48; 203/78; 203/90; 203/98; 203/100; 203/DIG. 17

(58) Field of Classification Search
USPC ......... 159/4.01, 16.1, 45, 48.1, 901, DIG. 40; 202/155, 172, 176, 182, 185.3, 200, 202/236; 203/10, 48, 78, 90, 94, 98, 100, 203/DIG. 17; 367/180
See application file for complete search history.

(56) References Cited

U.S. PATENT DOCUMENTS

| | | | |
|---|---|---|---|
| 3,317,405 A | | 5/1967 | Brown .......................... 202/176 |
| 4,585,524 A | | 4/1986 | Hoiss ............................. 203/11 |
| 4,666,564 A | * | 5/1987 | Zeitsch ......................... 203/86 |
| 5,509,996 A | * | 4/1996 | Assaf ............................ 159/48.2 |
| 5,624,608 A | * | 4/1997 | Ching et al. .................... 261/30 |
| 5,836,515 A | * | 11/1998 | Fonzes et al. ............. 239/102.2 |

(Continued)

FOREIGN PATENT DOCUMENTS

| | | | |
|---|---|---|---|
| EP | 3 306 294 | | 3/1989 |
| GB | 1233483 | * | 5/1971 |
| JP | 58-124580 | | 7/1983 |
| JP | 58-128181 | | 7/1983 |

*Primary Examiner* — Virginia Manoharan
(74) *Attorney, Agent, or Firm* — James C. Lydon

(57) ABSTRACT

Device for desalinating sea water comprising a unit (10) for spraying sea water in the form of droplets, a unit (20) for vaporizing the droplets into steam, a unit (30) for separating steam from salt particles, and a unit (40) for condensing steam into fresh water. The spraying unit comprises a sea water entry (12), an ambient-temperature dry air entry (14), and a device for generating acoustic waves at a frequency greater than 1 MHz focused by means of nozzles (17) receiving the sea water coming from the sea water entry so as to obtain microdroplets having a diameter comprised between about 2.5 microns and about 5 microns.

10 Claims, 2 Drawing Sheets

(56) References Cited

U.S. PATENT DOCUMENTS

| | | | |
|---|---|---|---|
| 6,699,369 B1 * | 3/2004 | Hartman et al. | 203/11 |
| 7,160,469 B2 * | 1/2007 | Mayer et al. | 210/695 |
| 7,357,849 B2 * | 4/2008 | Wright | 203/10 |
| 7,608,171 B2 * | 10/2009 | Otukol | 203/10 |
| 8,016,977 B2 * | 9/2011 | Rasmussen et al. | 159/4.01 |

\* cited by examiner

DEVICE FOR DESALINATING SEA WATER BY AMBIENT-TEMPERATURE SPRAYING

This application is a 371 of International Application PCT/FR2008/001740, filed Dec. 15, 2008.

TECHNICAL FIELD

The present invention relates to sea water desalination techniques based on spraying sea water in the form of droplets followed by vaporizing the water, and in particular to a device for desalinating sea water by ambient-temperature spraying.

STATE OF THE ART

Today, water is becoming a valuable commodity due to the fact that many regions in the world lack water for long periods of time. And yet, the oceans full of salt water cover three-quarters of the surface of the globe. Desalinating sea water to obtain drinkable fresh water has been considered for a long time.

Sea water desalinating techniques are based on either distillation, or on filtration. The most ancient technique, still in use, is that of distillation, according to which water is evaporated in successive modules. In each module, the residual sea water is concentrated into salt after vaporization, and the brine is recovered and evacuated. This technique is possible only when the source of heat is almost free, a residue from a nuclear power plant.

The techniques based on sea water filtration use the principle of reverse osmosis described in the French patent 2850038-A1. The osmotic pressure corresponds to the differential pressure between the two parts of an enclosure separated by a semi-permeable membrane. The solvent is located on one side of the membrane and a binary mixture of salt and solvent is on the other side. Once it has reached equilibrium, the solvent no longer goes through the semi-permeable membrane as the pressure on the solvent/salt side has reached the osmotic pressure. When, mechanically, the pressure on the solvent/salt side is increased and becomes greater than the osmotic pressure, the solvent can go through the membrane. The osmotic pressure of sea water is about 25 bars. The operation pressures for desalinating sea water are on the order of 70 to 100 bars. The major drawback of this technique is that it is expensive because of the high cost of semi-permeable membranes. Furthermore, as with the previous technique, this device pollutes since the brine must be thrown away.

In order to remedy the drawbacks of the techniques mentioned hereinabove, a water vaporization technique based on spraying sea water in the form of droplets before the vaporization has been developed. This technique is described in the patents GB 1,233,483 and U.S. Pat. No. 3,207,676 whereby water spraying in the form of droplets is achieved by a pressure drop in an enclosure through a nozzle by vibration of a plate on which drains a film water. Vaporization is achieved by heating the enclosure or the water.

The patent DE 3,122,312 describes a desalination device in which sea water is sprayed by means of an acoustic wave generated by a piezoelectric device. Such a device uses the vibration of a thin-walled metal cone on which the water to be sprayed can drip, the spraying being carried out in the area of the antinodes. The diameter of the drops for this type of spraying is on the order of one hundred or so microns and the frequency of vibration is always less then 100 kHz.

Unfortunately, the devices hereinabove described using sea water spraying are not efficient insofar as the water drops obtained have a diameter of at least 100 microns and therefore an exchange surface that is too weak. Furthermore, they all require heat, either for the water to be desalinated, or for the ambient air.

DESCRIPTION OF THE INVENTION

Therefore, the object of the invention is to provide a device for desalinating sea water by spraying based on the prior spraying in the form of ultra fine droplets so as to obtain a maximum exchange surface during spraying, without heat.

The object of the invention is therefore a sea water desalination device comprising a unit for spraying sea water in the form of droplets, a unit for vaporizing droplets into steam, a unit for separating steam from salt particles, and a unit for condensing steam into fresh water. The spraying unit comprises a sea water entry, an ambient-temperature dry air entry, and a device for generating acoustic waves at a frequency greater than 1 MHz focused by means of nozzles receiving the sea water coming from the sea water entry so as to obtain microdroplets having a diameter comprised between about 2.5 microns and about 5 microns.

Another object of the invention is a sea water desalinating system made of a plurality of desalination devices according to the invention, comprising an air circulation pump receiving the air coming out of the condensing unit of the last desalination device by the exit as well as by an air entry if it is necessary to let dry air enter the circuit in addition to the air recovered from the exit. A sea water entry provides the sea water necessary to the operation of all the desalination devices, each device, except the last one, comprising at the exit of its condensing unit a three-way valve adapted to take the necessary quantity of sea water and to dispatch it to the spraying device.

BRIEF DESCRIPTION OF THE DRAWINGS

The purposes, objects, and characteristics of the invention will be better understood from the description hereinafter, with reference to the drawings, in which.

DETAILED DESCRIPTION OF THE INVENTION

Figure 1:
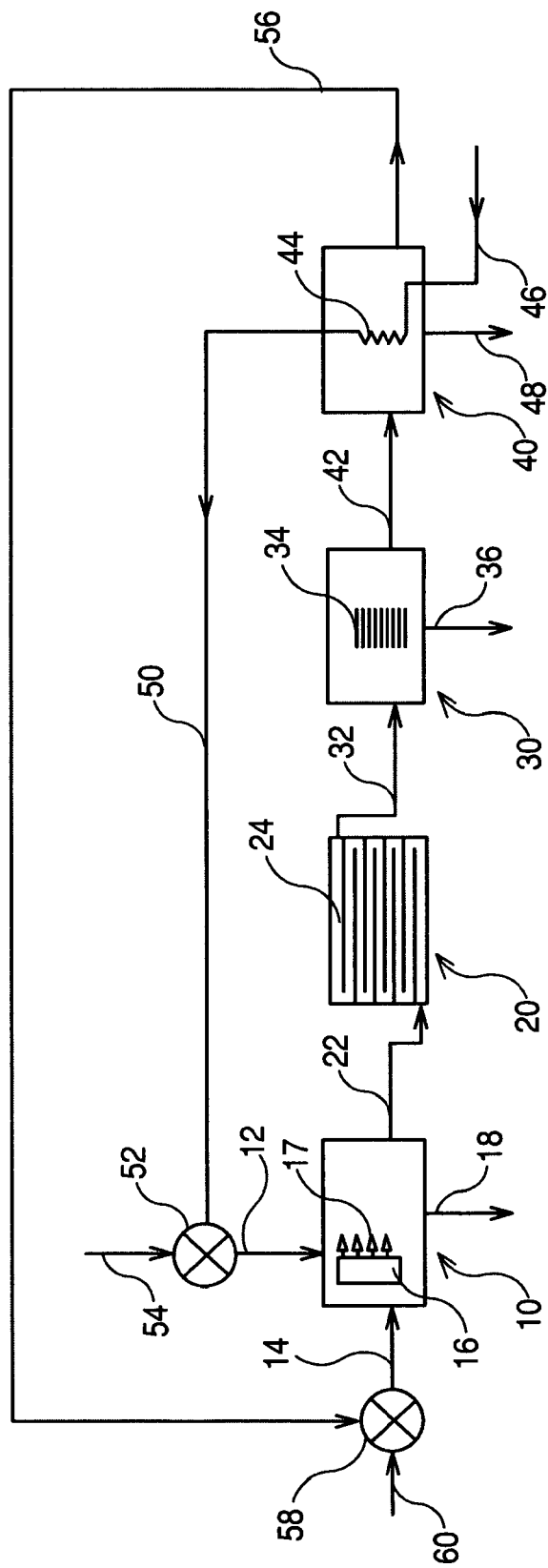
FIG. 1 is a diagram showing the sea water desalination device according to the invention.
Figure 2:
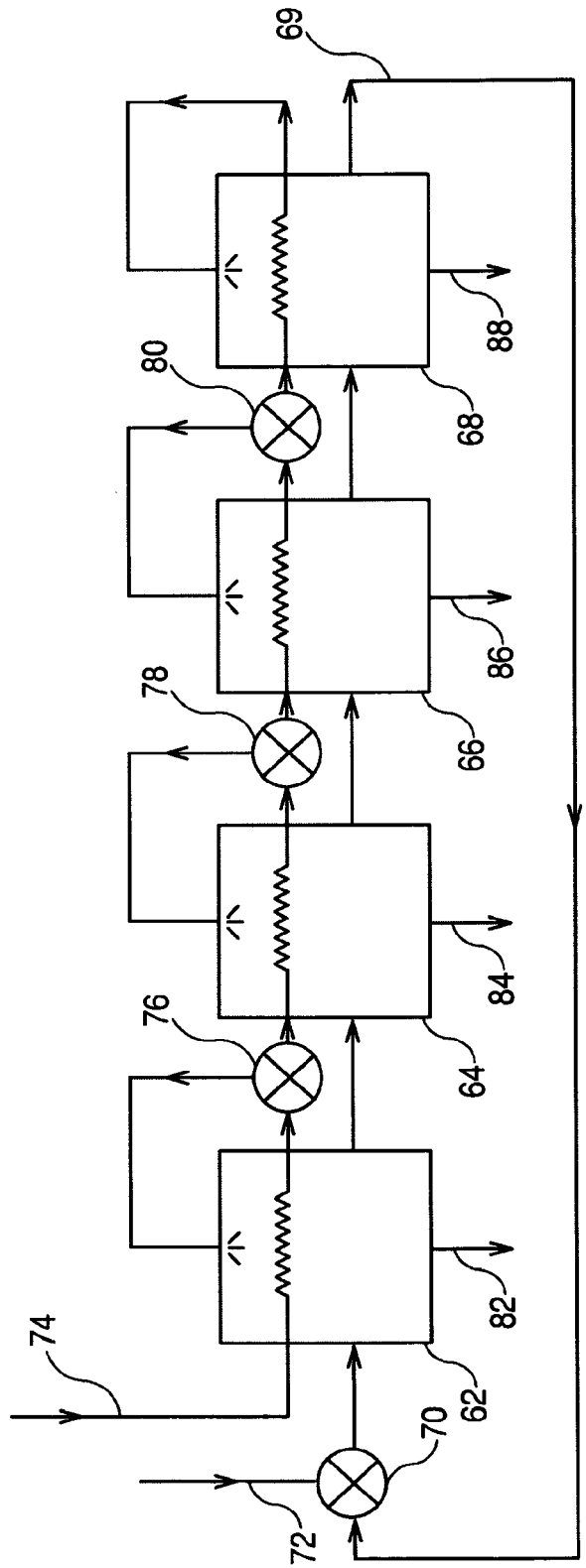
FIG. 2 is a diagram showing a sea water desalination system made of several desalination devices according to the invention shown in FIG. 1.

The device according to the invention is made of a spraying unit 10, a vaporizing unit 20, a separating unit 30, and a condensing unit 40.

The sea water is provided to the spraying unit 10 by an entry 12 and a flow of dry air that is not humidity saturated is provided by an entry 14. Spraying is carried out by means of a device 16 for generating high frequency acoustic wave and nozzles 17 receiving the sea water so as to obtain microdroplets of a few microns in diameter. The device 16 is preferably a piezoelectric device generating an acoustic wave which spreads and is concentrated in the medium to be sprayed by means of the nozzles 17. The liquid is brought under low pressure in the nozzles and forms a jet at the exit of the nozzles. The acoustic wave focused by each nozzle is concentrated in the jet. The high acoustic intensity then tears microdroplets off the wall of the jet. The air flow is such that it carries along in its trajectory the fine water droplets whereas the large drops are evacuated through an exit 18.

According to an essential characteristic of the invention, the piezoelectric device 16 generates high frequency acoustics of at least 1 MHz, and preferably 2 MHz, which has the advantage of spraying the water in the form of very fine droplets whose diameter is generally comprised between 2.5 and 5 microns, which translates to about 6 billion droplets per 1 g of water and a surface exchange between the water droplets and the air on the order of 2 $m^2$ per 1 g of water.

The fine droplets carried along by the air enter the vaporizing unit 20 by an entry 22. The size of the droplets provides for a volume surface ratio that is sufficient to carry out a vaporization at ambient temperature. The large exchange surface between the air and the droplets of sprayed liquid enables the droplets to vaporize themselves quickly. The period of vaporization depends on the humidity rate relative to the air since the closer the air is from saturation, the longer this vaporization takes. This is why it is necessary for the air flow which carries along the droplets to be dry. However, for this air humidity variability to be taken into account, the trajectory of the droplets must be sufficiently long for the air/droplets mixture to be transformed into a mixture of humid air and salt crystals upon reaching the exit of the vaporizing unit 20. This is achieved by a labyrinth-shaped structure 24 as schematically shown in the drawing.

After the vaporization, the flow exiting the vaporizing unit 20 enters the separating unit 30 through an entry 32. The flow then contains a gaseous mixture of air/vaporized liquid and solid particles of salt. In the separating unit 30, the separation of the solid crystals of salt can be carried out by different means such as filtration, centrifugation, electrostatic collecting.

The filtration can be carried out through a permeable wall whose pores have a diameter inferior to the size of the crystals. The crystals are stopped by the filter whereas the gas passes through the filter.

The centrifugal separation is achieved by placing the fluid mixture into rotation. The centrifugal force projects the solid particles, which are denser than gas, outside of the outflow. The solid particles are recovered on the outer wall of the centrifuge.

The electrostatic separation, which is the preferred embodiment, is carried out by means of an electrostatic filter 34 consisting of having the mixture go through a very intensive electric field. The charged particles are then attracted by metallic plates having a polarization opposite that of the charge of the particles, the plates being judiciously placed so as to stop all the particles. This device is all the more efficient due to the small size of the particles and it has the advantage of having a very small charge loss with respect to the outflow of circulating air.

No matter the embodiment used for the separation, the solid particles of salt recovered are evacuated from the separating unit through the exit 36.

The humid air exiting the separating unit 30 then enters the condensing unit 40 through the entry 42. It frees itself of its water on a condenser 44 maintained at a temperature, which is inferior to that of the air entering the condensing unit 40. Although a specific condenser could be used, a characteristic of the invention consists in having the sea water to be desalinated enter the condenser 44 through the entry 46. Generally, the sea water temperature is comprised between 10° C. and 15° C. whereas the air circulating in the device is at ambient temperature, which means it is comprised between 20° C. and 25° C.

The fresh water which has been condensed due to the condenser 44 is recovered at the exit 48. The calories released by the humid air by condensing themselves on the condenser 44 are used to elevate the sea water temperature at the exit of the condenser.

According to the preferred embodiment shown in FIG. 1, the sea water which exits the condensing unit 40 through the exit 50 is at ambient temperature. If the temperature of the sea water is too low, it is possible to provide for a heating means (not shown) at the exit 50. The sea water is then sent to the sea water circulation pump 52. An entry 54 makes it possible, if necessary, to have sea water enter the circuit in addition to that which is introduced at the entry 46. The sea water placed in circulation by the pump 52 is introduced into the spraying unit through the entry 12 as described hereinabove.

According to a characteristic of the invention, the dry air which exits the condensing unit 40 through the exit 56 is used for carrying the water along through the device. To do so, the air recovered at the exit 56 is sent to an air circulation pump 58 which provides the air at the entry 14 as described hereinabove. An entry 60 makes it possible, if necessary, to have dry air enter the circuit in addition to the air recovered at the exit 56, for example when the air circulating in the device is too humid. It must be noted that if the temperature of the dry air at the exit 56 is too low, for example less than 20° C., it is possible to provide for a heating means (not shown) at the exit 56.

According to another embodiment of the invention, a plurality of desalination devices, like the one which has just been described, can be connected in series to form a sea water desalination system. A system comprising four desalination devices 62, 64, 66, and 68, is shown in the drawing. It must be noted that such a system could comprise any number of desalination devices like the one show in FIG. 1.

The air circulation in the system is carried out due to an air circulation pump 70 which receives the air exiting the last device 68 through the exit 69 as well as by an air entry 72 if it is necessary to have dry air enter the circuit in addition to the air recovered at the exit 69, for example when the air circulating in the system is too humid.

The sea water is provided by an entry 74 of the first device 62. The flow of this entry which must be sufficient to provide sea water to all the devices, is determined as a function of the number of desalination devices in the system. At the exit of the condensing unit of each one of the devices 62, 64, and 66, three-way valves allow for taking a portion of the sea water and for sending it to the spraying unit of the device. Thus, the valve 76 makes it possible to send the sea water necessary to the spraying unit of the device 62, the valve 78 to the spraying unit of the device 64, and the valve 80 to the spraying unit of the device 66. The sea water coming from the condenser of the device 68 is sent in its entirety to the entry of the spraying unit of the device 68.

Finally, each device comprises a fresh water exit, the exit 82 for the desalination device 62, the exit 84 for the desalination device 64, the exit 86 for the desalination device 66, and the exit 88 for the desalination device 68.

The invention claimed is:

1. A system for desalinating sea water comprising a plurality of desalination devices, each desalination device comprising a unit for spraying sea water in the form of droplets, a unit for vaporizing said droplets into steam, a unit for separating steam from salt particles, a unit for condensing steam into fresh water comprising a condenser, wherein said spraying unit comprises a sea water entry, an ambient-temperature dry air entry, and a device for generating acoustic waves at a frequency greater than 1 MHz focused by means of nozzles receiving the sea water from said sea water entry so as to obtain microdroplets having a diameter comprised between 2.5 and 5 microns, wherein steam and air exits the separating unit and enters the unit for condensing steam into fresh water, the condenser is maintained at a temperature which is inferior to that of the air entering the condensing unit by means of sea water entering the condenser before reaching the unit for spraying sea water, said system further comprising an air pump adapted to receive air exiting the condensing unit of a last desalination device as well as being adapted to receive air from an air entry so as to permit dry air to enter said system in addition to air recovered from said last desalination device.

2. The system of claim 1, further comprising an air circuit for providing air coming from an exit of the condenser to the ambient-temperature dry air entry.

3. The system of claim 1, in which said device for generating acoustic waves comprises a piezoelectric device generating acoustic waves which spread in the sea water brought under low pressure in each one of said nozzles and forms a jet at the exit of said nozzle.

4. The system of claim 1, in which the acoustic waves generated by said device for generating acoustic waves have a frequency of 2 MHz.

5. The system of claim 1, in which said vaporizing unit comprises a labyrinth-shaped structure configured to provide a mixture of humid air and salt crystals upon reaching the exit of said vaporizing unit.

6. The system of claim 5, in which said separating unit comprises an electrostatic filter in which solid particles of salt are first polarized by making the mixture go through an electrical field, and then are attracted by metallic plates having a polarization opposite that of the particles charge.

7. The system of claim 6, in which said condensing unit comprises a condenser for condensing the contained steam provided by said separating unit, said condenser receiving sea water to be desalinated at a temperature comprised between 10° C. and 15° C.

8. The system of claim 7, further comprising a sea water circulation pump receiving the sea water coming from said condenser so as to send it to the entry of said spraying unit.

9. The system of claim 1, further comprising an air circulation pump which provides the dry air entry of said spraying unit with the dry air coming from the condensing unit.

10. The system of claim 1, comprising a sea water entry providing the sea water to all the desalination devices, each one of said devices, except the last one, having at the exit of its condensing unit, a three-way valve adapted to take the necessary quantity of sea water and send it to the spraying unit of said device.

* * * * *